United States Patent [19]

Omata et al.

[11] Patent Number: 4,527,675
[45] Date of Patent: Jul. 9, 1985

[54] OIL TYPE DAMPER

[75] Inventors: Nobuaki Omata, Yokohama; Tsutomu Oshida, Tokyo, both of Japan

[73] Assignee: Nifco Inc., Yokohama, Japan

[21] Appl. No.: 601,899

[22] Filed: Apr. 19, 1984

[51] Int. Cl.³ .............................................. F16D 57/00
[52] U.S. Cl. .................................. 188/290; 16/82; 188/322.5
[58] Field of Search ............... 188/290, 276, 266, 293, 188/292, 264 E, 332.5; 16/82

[56] References Cited

U.S. PATENT DOCUMENTS 3,861,503  1/1975  Nash ............................ 188/290 X
4,342,135  8/1982  Matsuo et al. ................. 188/290 X

FOREIGN PATENT DOCUMENTS 277368   9/1930  Italy ............................................ 16/82
55-75805 5/1980  Japan ........................................... 16/82

Primary Examiner—Bruce H. Stoner, Jr.
Assistant Examiner—Robert J. Oberleitner
Attorney, Agent, or Firm—J. R. Halvorsen; T. W. Buckman

[57] ABSTRACT

An oil type damper comprises a housing, a rotator formed of a hollow shaft and a braking disk, a flexible membrane, a toothed wheel secured to the leading end of the aforementioned hollow shaft, and oil introduced via the hollow shaft into the housing. Since the oil is introduced through the hollow shaft into the housing after the rotator and the flexible membrane have been set in place inside the housing, the work of filling the damper with oil is easy. The flexible membrane absorbs thermal expansion of the oil and precludes otherwise possible oil leakage.

2 Claims, 3 Drawing Figures

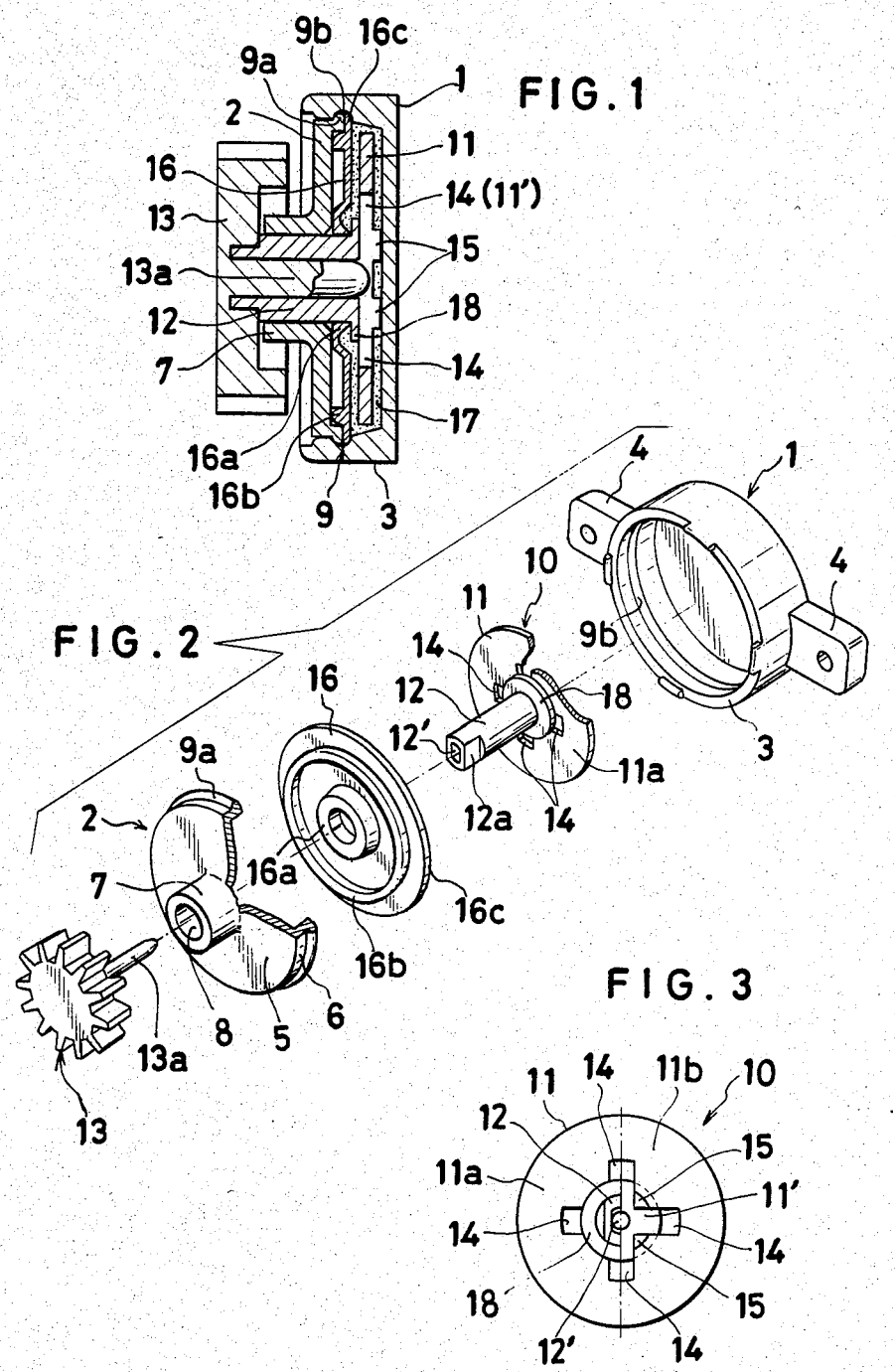

OIL TYPE DAMPER

BACKGROUND OF THE INVENTION

This invention relates to an oil type damper for braking and absorbing the opening and closing motion of, for example, a freely openable lid having one end thereof pivotally attached to some type of mechanical device, and more particularly to an improved oil type damper of a construction such that otherwise possible leakage of the damper oil due to a change in ambient temperature can be prevented and, at the same time, the work of filling the damper with oil can be carried out with ease.

In an electric device such as a cassette tape recorder or a video tape recorder, a cassette tape as a recording medium is set in place in the cassette holder of the device proper and set running therein to effect desired recording or playback. In this case, the cassette holder itself is popped out of the device proper by pressing an ejection button or the lid for the cassette holder is caused to fly open to permit the cassette to be removed from or inserted into the cassette holder. Thereafter, the cassette holder or the lid is pushed back into place on the device proper to ready the device for use. The vibration attendant upon the opening and closing motion of the cassette holder or the lid has an adverse effect upon the device. Further, the impact causes a disagreeable sensation to the hand of the person handling the device. To overcome these disadvantages, dampers of various forms have been proposed to date. Broadly, these dampers may be divided into frictional dampers and oil type dampers. The dampers of the frictional type suffer a gradual decline in performance with use. They cannot maintain good braking performance and have poor durability. Frictional dampers have therefore given way to the oil type dampers because the drawbacks of such dampers as described above are inherent to the structure of these dampers and can be eliminated only to a limited extent. This does not mean that the oil type dampers are perfectly free from disadvantages. When the ambient temperature changes, for example, there is the possibility that the housing filled with the oil will permit leakage of oil, which could result in complete impairment of the damper's function.

In Japanese Utility Model Application Disclosure SHO 58(1983)-189843, the inventors of this invention propose an oil type damper which is provided in a housing thereof with a soft flexible membrane possessing elasticity as well as a rotator so that any thermal expansion of the oil in the housing will be absorbed by the flexible membrane and consequently prevented from leaking out of the housing. Generally in any of the conventional oil type dampers including the oil type damper proposed by the inventors as described above, the braking disk of the rotator is coated on the opposite surfaces and the circumferential boundary thereof with oil such as silicone grease with the aid of a brush before it is set in place inside the housing during the course of assembly of the damper. The work of applying the oil to the braking disk calls for the most meticulous care. Highly advanced skill on the part of the worker is indispensable to uniform application of a stated amount of oil to the interior of the housing.

SUMMARY OF THE INVENTION

An object of this invention is to provide an oil type damper so constructed that the damper can manifest the shock absorbing property thereof satisfactorily for a long time without permitting the oil contained therein to leak from the housing under the influence of changes in temperature of the ambient air and the housing can be filled with the oil simply and uniformly so as to ensure easy assembly of the damper.

The object described above is accomplished by providing an oil type damper which comprises a housing, a rotator formed of a hollow shaft and a braking disk, a flexible membrane set in place inside the housing, and a toothed wheel secured to the end of the hollow shaft.

After the housing has accommodated therein the braking disk of the rotator and the flexible membrane, oil is injected into the housing through an opening in the hollow shaft. The oil so injected fills up an empty space enclosed inside the housing with the flexible membrane and functions to restrain the movement of the rotator within the empty space. Thereafter, the toothed wheel is fitted fast on the end of the hollow shaft.

Even when the oil contained within the housing is expanded or contracted by changes in ambient temperature, the flexible membrane absorbs such voluminal change of the oil and prevents the oil from leaking to the exterior. Since the oil is introduced into the damper through the hollow shaft after the damper has been assembled substantially completely, the work of assembly is simple and otherwise possible variation in product quality is eliminated.

The other objects and characteristics of the present invention will become apparent from the further disclosure to be made in the following description of a preferred embodiment, with reference to the accompanying drawings.

BRIEF EXPLANATION OF THE DRAWINGS

FIG. 1 is a cross section illustrating a typical damper of this invention in an assembled state.

FIG. 2 is a perspective view of the damper of FIG. 1 in a disassembled state.

FIG. 3 is an explanatory diagram of a rotator showing the front view thereof in one half and the rear view thereof in the other half.

DESCRIPTION OF THE PREFERRED EMBODIMENT

In the drawings, 1 and 2 denote a base and a cap molded of a plastic material to form a cylindrical housing. The base 1 integrally comprises a cylindrical wall 3 having a bottom and fitting pieces 4 extended outwardly from the cylindrical wall 3 and adapted to be fastened to the machine with which the damper is to be used. The cap 2 comprises a covering wall 5 adapted to come into intimate contact with the open end face of the cylindrical wall 3, an engaging wall 6 extended inwardly in the axial direction from the inner side of the covering wall 5 for enough to come into engagement with the inner wall of the cylindrical wall 3 to substantially one half the length of the inner wall in the axial direction, and a boss 7 projecting outwardly in the axial direction from the center of the outer side of the covering wall. A continuous central hole 8 extends through the covering wall 5 and the boss 7.

On the inner surface of the cylindrical wall 3 and on the outer surface at the leading end of the engaging wall 6, there are jointly provided an annular ridge 9a and an annular groove 9b together constituting a snap engaging means 9 adapted to come into snapping engagement when the engaging wall 6 is forced into the cylindrical wall along the inner wall thereof and the covering wall 5 is consequently allowed to close the open side of the cylindrical wall.

By 10 is denoted a rotator. In the present embodiment, the rotator 10 comprises a braking disk 11 and a hollow shaft 12 projected from the central part of one side of the braking disk 11. This hollow shaft 12 passes through the central hole 8 of the cap outwardly from the inner side of the cap 2 and projects beyond the leading end of the boss 7. To the projecting end of the hollow shaft 12, is secured a toothed wheel 13. The diameter of the braking disk 11 is slightly smaller than the inside diameter of the engaging wall 6.

The braking disk 11 is provided around the base of the hollow shaft 12 with one or a plurality of window holes 14 (four window holes spaced equally in the circumferential direction in the illustrated embodiment). It is further provided on the surface 11b opposite from the surface 11a supporting the hollow shaft 12 with a plurality of circumferentially distributed protuberances 15 adapted to collide against the bottom surface of the cylindrical wall 3 and retain gaps on the bottom surface. These gaps serve to enable the oil which is injected through the hollow part as described afterward to flow into the housing from the inner edge of the hollow shaft 12.

Denoted by 16 is a soft flexible membrane possessing elasticity. This flexible membrane readily deforms under the pressure exerted by the oil when the oil is thermally expanded, so as to absorb any voluminal change of the oil. This flexible membrane is molded as a thin wall with a material having a small coefficient of thermal expansion such as, for example, a synthetic rubber or a flexible plastic, typically polyethylene or polypropylene. It is provided on the inner wall thereof with an annular lip 16a adapted to come into sealing contact with the outer wall of the hollow shaft 12 and prevent the oil from flowing along the outer surface of the hollow shaft 12 and leaking out of the housing. It is further provided on the outer wall thereof with an annular ridge 16b and an external edge 16c.

The outside diameter of the flexible membrane is larger than the inside diameter of the cylindrical wall 3. In the present embodiment, the flexible membrane is secured to the housing by bringing the outer edge 16c into engagement with the annular groove 9b on the inner wall of the cylindrical wall 3 and setting the cap 2 into snapping engagement with the annular groove. The flexible membrane nevertheless is allowed to keep a distance from the surface 11a of the braking disk 11.

The toothed wheel 13 is provided in advance with a pin 13a adapted to be forced into the hollow part 12' of the shaft 12.

Assembly of the damper is accomplished by fitting the inner wall of the flexible membrane 16 around the hollow shaft 12, then passing the hollow shaft through the central hole 8 of the cap 2 outwardly from the inner side of the cap until the tip of the shaft projects out of the leading end of the boss 7, setting the braking disk 11 and the flexible membrane 16 in place inside the cylindrical wall of the base, and forcing the cap into the cylindrical wall along the inner wall thereof. Consequently, the cap 2 is fastened to the base 1 by the snap engaging means 9 to give rise to a housing and, at the same time, the outer edge 16c of the flexible membrane 16 is engaged with the annular groove 9b. At this time, the annular ridge 16b of the flexible membrane 16 collides with the bottom surface of the covering wall 5 of the cap 2 to stabilize the shape of the flexible membrane 16 in its fixed condition.

Subsequently, oil is injected through the outer extremity of the hollow part 12' of the shaft 12 by the use of an oiler of the shape of a syringe. As a result, the oil flows into and fills up the gaps formed by the protuberances 15 between the surface 11b of the braking disk and the bottom of the cylindrical wall 3. The oil also flows on the outer wall of the braking disk and through the window holes 14 to reach the other surface 11a and fill up the gap between the flexible membrane 16 and the surface 11a. The oil filled region is denoted by 17 in FIG. 1.

To prevent idle rotation of the toothed wheel 13 relative to the shaft 12 in the present embodiment, the outer extremity 12a of the shaft 12 is given a generally elliptical profile, and the toothed wheel is provided around the base of the pin 13a with a similarly shaped depression. The shapes of the profile, the depression, and the cross sections are not limited to ellipses. They may instead be semicircular (like the letter D) or polygonal.

After the injection of the oil, the pin 13a of the toothed wheel 13 is inserted into the hollow part 12' of the shaft 12 from the outer side to perfectly close the hollow part. In this case, air remaining in the hollow part 12' escapes through a gap between the pin 13 and the inner periphery of the shaft 12 as the pin 13 is inserted into the hollow part 12'. The oil thus introduced into the housing is tightly closed in because the outer edge 16c of the flexible membrane 16 is pressed on and engaged with the annular groove 9b of the housing by the annular ridge 9a of the cap 2 and the outer side surface and outer peripheral surface of the shafts 12 come into tight contact with the peripheral surface of the depression formed around the base of the pin 13a. As a result, the outer boundary of the flexible membrane 16 is sealed and, in the meantime, the annular lip 16a on the inner wall of the flexible membrane is tightly fitted around the hollow shaft 12 of the rotator 10.

When the braking disk 11 is provided with one or a plurality of window holes 14 as in the present embodiment, the oil can be supplied to the surface 11a side of the disk through the window holes 14 as well as around the outer boundary of the disk. Consequently, the time required for the injection of the oil can be shortened and the damper's braking effect can be improved.

As regards the window holes 14 provided to facilitate the circulation of the injected oil inside the damper in the present embodiment, the braking disk 11 is provided concentrically therein with empty parts 11' arranged in a cruciform pattern and it is further provided concentrically on the surface 11a with a thin-walled disk part 18 adapted to cover the region of the empty parts 11' near the center of the braking disk 11. Thus, the edges of the empty parts 11' which are not closed by the thin-walled disk part 18 serve as window holes 14. The protuberances 15 are formed at the four corners distributed in a cruciform pattern on the surface 11b. The hollow shaft 12 extends through the thin-walled disk part 18 and the inner extremity of the hollow part 12' opens into the thin-walled disk part 18. As a result, the injected oil is made to flow from the inner end of the shaft into the empty parts 11' distributed in a cruciform pattern, then led through the empty parts in the direction of the window holes 14. Part of the oil flows through the window holes 14 and fills up the gap on the surface 11a side of the braking disk and the remaining part of the oil fills up the gaps formed by the protuberances 15.

As is plain from the foregoing description, the present invention obviates the need to spend much time and labor for the application of the oil to the braking disk using a brush, for example. Moreover, when dampers according to this invention are mass produced, since the amount of oil required to be injected is substantially the same for all dampers, injection of the proper amount of oil can be obtained by using an oiler capable of injecting a fixed amount of oil each time. A typical example of such an oiler is a transparent graduated cylinder which, like a syringe, shows the supply of oil held inside. When the oil is applied by the use of a brush, for example, the amount of oil so applied is liable to variation and the braking ability consequently varies from damper to damper. In contrast, the present invention can provide dampers of consistent braking ability.

The illustrated embodiment has one rotator provided within one housing. Optionally, a partition wall may be formed inside the housing, tubular walls may be extended outwardly from the opposite sides of the partition wall, and two rotators may be fitted in mutually opposite directions into the tubular walls.

What is claimed is:

1. An oil type damper, comprising in combination a housing formed of a base and a cap; a rotator formed of a braking disk set in place inside said housing and a hollow shaft extending outwardly from said braking disk and provided with an axial hollow part, said disk being fixed to said hollow shaft, the hollow part of said hollow shaft communicating with the interior of said housing; a flexible membrane mounted around said hollow shaft of said rotator and secured by the circumferential boundary of said membrane to said housing and set in place inside said housing; a toothed wheel adapted to transmit rotational force and having means to secure said toothed wheel to the leading end of said hollow shaft of said rotator extending out of said housing so as to close the outward extremity of the hollow part of said hollow shaft; and oil to fill up the space surrounding said rotator said hollow shaft defining oil passage means permitting said oil to be supplied through said hollow part of said hollow shaft of said rotator after said rotator and said flexible membrane have been set in place inside said housing but before said toothed wheel is secured to said hollow shaft.

2. An oil type damper according to claim 1, wherein said braking disk is provided with window holes in the disk wall thereof.

* * * * *